United States Patent [19]

Berthollet

[11] 4,332,093
[45] Jun. 1, 1982

[54] APPARATUS FOR UPROOTING SHRUBS AND THE LIKE

[76] Inventor: Pierre Berthollet, La Bouviere, Saint Sulpice (Savoie), France

[21] Appl. No.: 168,273

[22] Filed: Jul. 10, 1980

[30] Foreign Application Priority Data

Jul. 11, 1979 [FR] France ................... 79 18511

[51] Int. Cl.³ ............................................. A01G 23/06
[52] U.S. Cl. ....................................... 37/2 R; 171/62;
144/2 N
[58] Field of Search ..................... 171/62; 37/2; 47/76;
144/2 N

[56]  References Cited
U.S. PATENT DOCUMENTS

| 3,078,602 | 2/1963 | Holopainen | 37/2 R |
| 3,163,944 | 1/1965 | Whitcomb | 37/2 R |
| 3,623,245 | 11/1971 | Adams | |
| 3,717,944 | 2/1973 | Clegg | 37/2 R |
| 4,068,396 | 1/1978 | Langguth | 37/2 R |

Primary Examiner—Robert A. Hafer
Attorney, Agent, or Firm—Karl F. Ross

[57]  ABSTRACT

A machine for cutting shrubs and other plants from the soil and for lifting them with their root balls intact to deposit them upon the ground or in a previously formed hole for transplanting, comprises a support mounted on the three-point hitch of a tractor and provided with a spade or blade which can be drawn downwardly below the shrub by forward movement of the tractor and then rotated through 360° to free the root ball from the surrounding soil. The support also carries an arm which can engage the root neck, stalk, trunk or stem of the shrub to hold and displace it independently of the blade-carrying structure.

4 Claims, 13 Drawing Figures

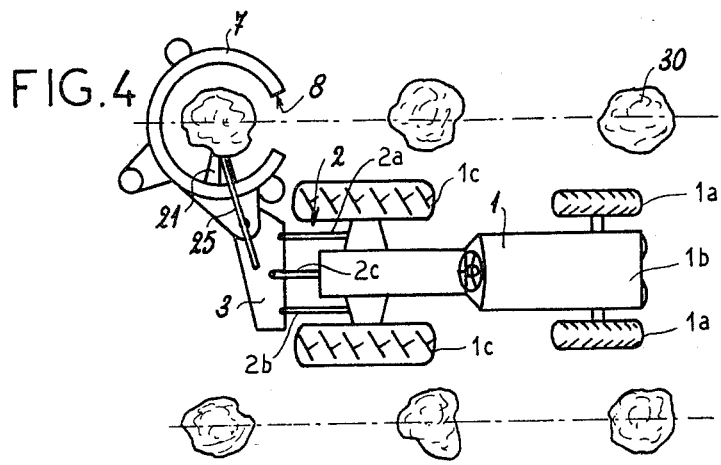
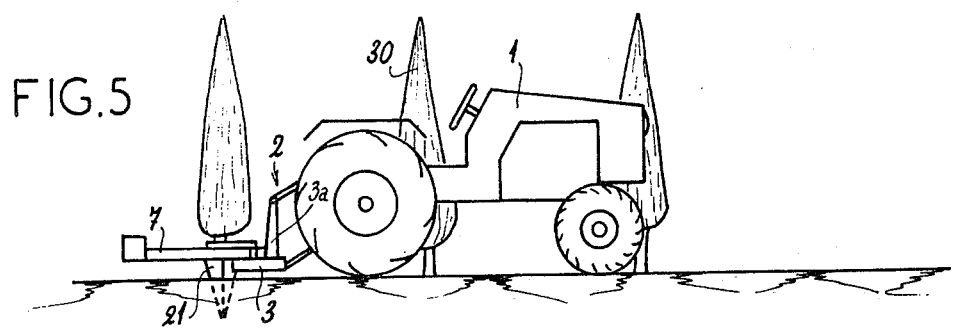
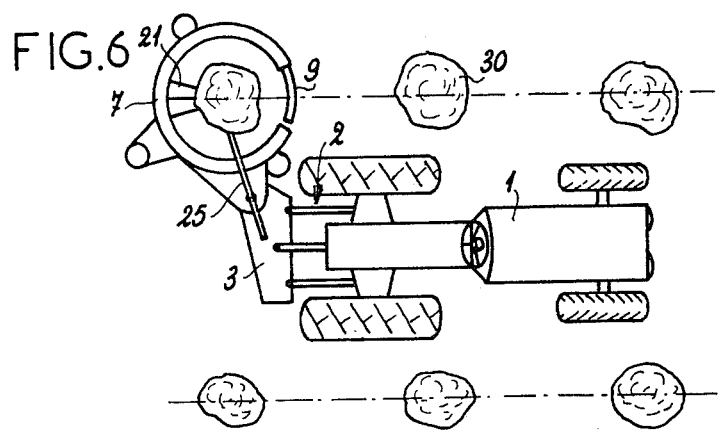

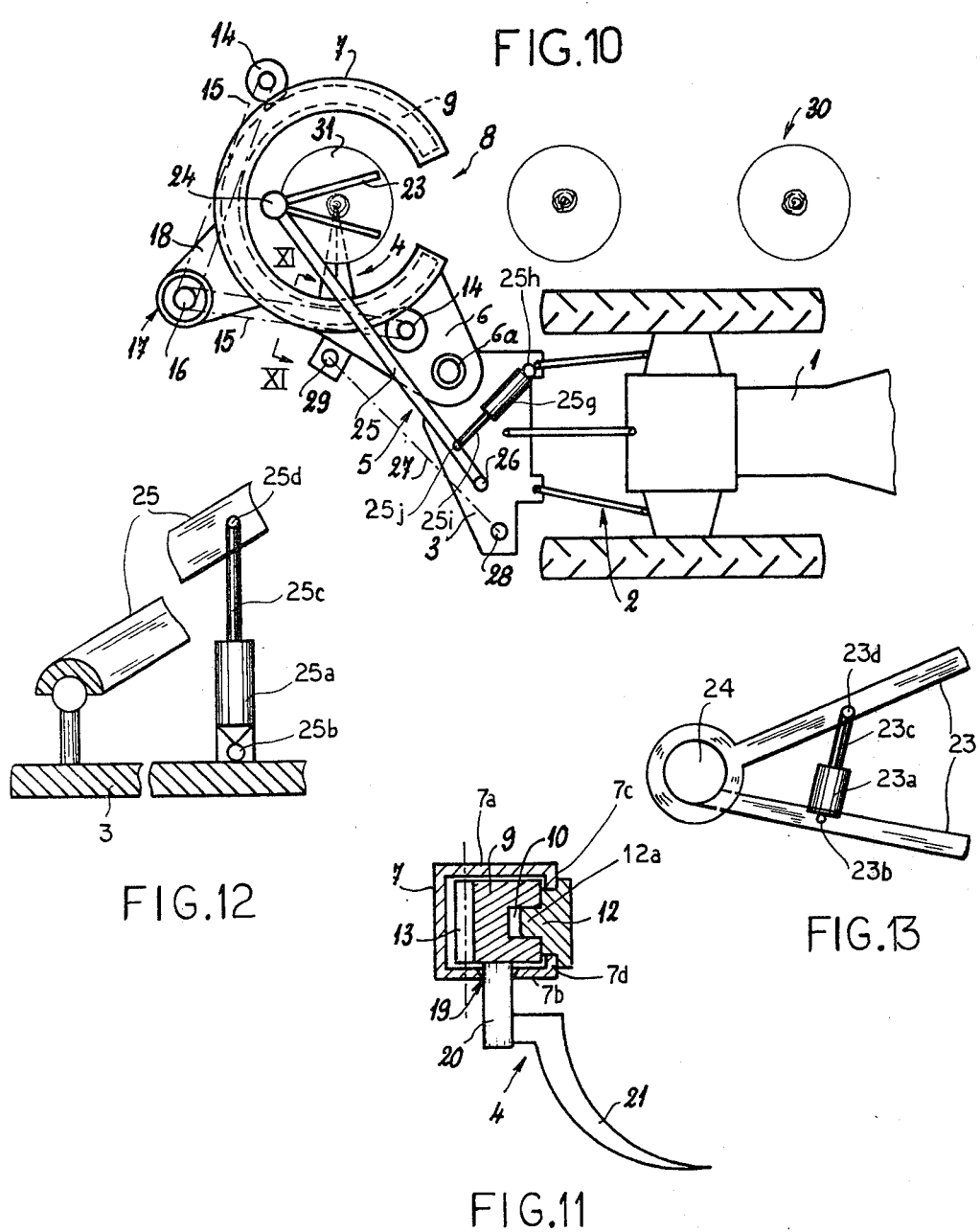

APPARATUS FOR UPROOTING SHRUBS AND THE LIKE

FIELD OF THE INVENTION

My present invention relates to an apparatus or machine for uprooting shrubs and other plants having a trunk, stalk, root neck or the like, with intact root balls, i.e. a cluster of soil surrounding the roots, for transplanting or simple removal. More particularly, the invention relates to an apparatus which is capable of simply and conveniently removing plants with attached root balls from the soil and manipulating the plants after this removal, e.g. for transplantation to a given location or for packaging of the root balls.

BACKGROUND OF THE INVENTION

In tree and shrub culture generally, it is desirable to be able to lift or uproot the tree or shrub from one growth site, with an intact root ball or mass of soil packed around the roots, and to deposit the plant at a new site, e.g. in a hole prepared to receive the root ball or on the surface of the ground. In plant nurseries, moreover, the manipulation of the uprooted shrub can be a first stage in the packaging of the root ball in burlap or in a container for temporary storage, for sale or for subsequent delivery to a replanting site.

Naturally, this can be done with considerable manual labor by spading around the plant at a distance sufficient to sever the rootball from the surrounding soil. The plant can then be lifted by grasping the root neck, stalk or trunk.

Apparatus for carrying out plant uprooting is especially important in nursery applications and a variety of machines have been proposed to facilitate this work.

Until now, however, as far as I am aware, there has been no inexpensive machine capable of conveniently carrying out the necessary processes for uprooting with a minimum of manual effort and readily adaptable to existing agricultural and other tractors.

OBJECTS OF THE INVENTION

It is, therefore, the principal object of my invention to provide a machine having the desirable characteristics described and which is of an inexpensive and simple construction, is readily maintained and operated, is capable of uprooting and transplanting or repositioning nursery and other plants with root balls intact.

A more specific object of this invention is to provide a machine capable of uprooting shrubs and other plants by severing the root balls from the surrounding soil which will also facilitate subsequent manipulation of the plant, e.g. moving it to a new site.

Yet a further object of this invention is to provide a machine capable of uprooting and transplanting shrubs and like plants which will speed the operation and minimize the labor.

SUMMARY OF THE INVENTION

These objects and others which will become apparent hereinafter are attained, in accordance with the present invention, in a machine which comprises a support mounted upon the three-point hitch of a tractor and therefore adapted to be raised and lowered by the mechanism for operating this hitch, a blade or spade which is downwardly and inwardly curved toward an axis about which the blade is rotatable relative to the support, and an arm mounted upon the support and engageable with the root neck, trunk or stalk of the plant to facilitate its lifting from the soil after the blade has cut the root ball from the surrounding soil.

According to an important feature of the invention, the blade is actuated successively by a soil-penetrating movement combining the lowering of the support by the hitch and the advance of the tractor whereupon, with the tractor stationary, the blade is caused to rotate through 360° about a vertical axis substantially coinciding with the vertical axis of the trunk stem or stalk.

The lifting arm comprises a pincers, e.g. a pair of jaws, and is capable of double movement, i.e. with two degrees of freedom such as a raising/lowering movement and a displacement in a horizontal plane, for lifting the plant initially and then shifting it laterally to deposit it on the surface of the ground.

The blade advantageously has a downwardly and inwardly curved shape with a head rigid with a crown or ring of generally circular configuration lying in a horizontal plane and provided with an opening angularly offset from the blade. This crown is slidably mounted in another crown or ring, rigid with an attachment foot connecting it pivotally to the support carried by the tractor hitch.

This second crown is provided with an opening over an arc of substantially equal length to the angle of the opening of the first crown so that when these crowns register or are aligned, the two crowns can be brought laterally around the plant and the latter centered within the two crowns. Naturally, the two openings should be of sufficient arc length to allow the largest trunk of the shrub to be removed to pass through these openings. When the openings are aligned, they are advantageously turned forwardly so that the action of centering the shrub within the crowns by movement of the tractor, for example, can be combined with the downward movement of the blade, which can be 90° offset from its ring opening, to position the latter for severing the root ball from the surrounding soil.

Means are provided for displacing the first crown or ring on the second crown thereby permitting the blade to rotate through 360° about the axis of the crown with the axis of the shrub centered therein.

The uprooting of the shrub thus requires the outer or ring crown to support the inner crown or ring which is formed with the blade or spade and further that this outer crown be capable of being swung, by pivotal connection of its foot to the support, into a position in which the aligned openings are turned forwardly.

When, however, the machine is not being used for transplantation of shrubs, uprooting or the like, the crown assembly can be swung to lie directly behind the tractor, thereby decreasing the road width required for the machine. This horizontal displacement of the crowns can be effected by a fluid-responsive cylinder-and-piston arrangement pivotally connected to the support and the foot which pivotally links the crowns to the support.

The means used for effecting relative rotation of the two crowns can comprise, according to the invention, a rack or set of teeth formed on one of the surfaces of the inner crown and meshing with a pinion rotatably mounted on the fixed crown and driven by a motor.

BRIEF DESCRIPTION OF THE DRAWING

The above and other objecs, features and advantages of the present invention will become more readily apparent from the following description, reference being made to the accompanying drawing in which:

FIG. 4 is another plan view of the machine after the first stage in setting the blade has been completed;

FIG. 5 is a side elevational view of the machine in the position corresponding to FIG. 4;

FIG. 6 shows the machine during the operation of severing the root ball from the surrounding soil, also in a plan view;

FIG. 10 is a plan view in somewhat larger scale but also highly diagrammatic, illustrating the mechanism of the invention;

FIG. 11 is a section along the line XI—XI of FIG. 10; and

FIGS. 12 and 13 are diagrams illustrating actuating mechanisms used in the system of the present invention.

SPECIFIC DESCRIPTION

Figure 1:
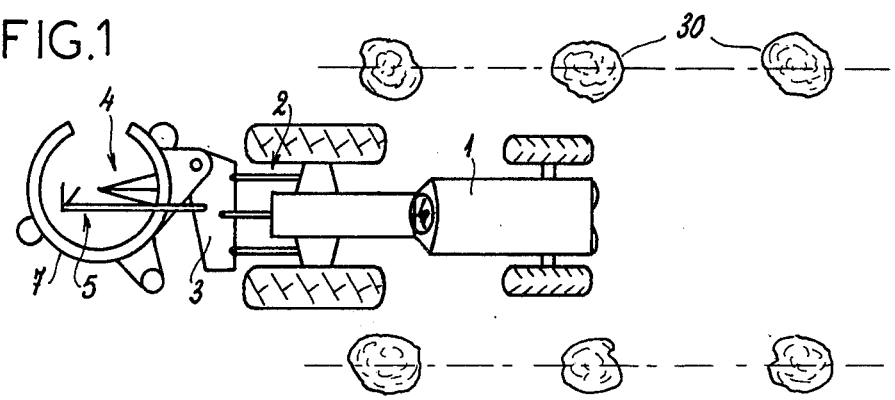
FIG. 1 is a plan view showing, in highly diagrammatic form and with parts not essential for a general description omitted, a machine according to the invention being displaced through a plot between two rows of shrubs which are to be uprooted.

In FIGS. 1 through 9, a conventional agricultural tractor 1 has been shown to have front wheels 1a, an engine compartment 1b, rear wheels 1c and a three-point hitch which has been highly diagrammatically illustrated at 2, and in accordance with conventional techniques can comprise, a pair of lower links 2a and 2b pivotally connected to a support 3, and an upper link 2c which is articulated to a post 3a upon the support 3. This three-point hitch is raised and lowered by the conventional hydraulics of the tractor and maintains the support 3 horizontal and parallel to itself and all vertical positions of the support.

The support 3 carries all of the essential elements of the uprooting mechanism of the invention and can be connected to the three-point hitch by easily released couplings so that it can be removed and attached with ease.

The two main units of the apparatus are a unit 4 for severing the root ball from the surrounding soil and a tool 5 for lifting the shrub and the root ball attached thereto.

When the term "shrub" is used herein it should be noted that it is intended to include all plants which must or should be uprooted with intact root balls, whether for transplantation or not and having at least one central stem, stalk, trunk or root throat which can be gripped to lift the shrub and its root ball.

The blade mechanism 4 comprises a foot 6 which is pivotally mounted at 6a to the support 3 and is rigid with an outer crown 7 lying in a horizontal or substantially horizontal plane.

The crown 7 is of generally U-cross section with its two shanks being horizontal and is formed with an opening 8 which, when the machine is not in use, can open laterally (FIG. 1) but which opens upwardly when the machine is used for uprooting a shrub 30 as has been indicated in FIGS. 2, 4, 6 and 10.

Within this crown 7, there slides an inner crown 9 also provided with an opening whose arc length or angle is substantially equal to that of the opening 8 of crown 7.

Guiding of the crown 9 within the crown 7 can be effected by the cooperation of a groove 10 of crown 9 with a block 12 whose rib 12a fits slidably into the groove 10 (FIG. 11).

The block 12 is, in turn, fitted between the two shanks 7a and 7b of the outer crown 7 and can be held by inwardly turned ledges 7c and 7d in place.

Along its vertical external face, the crown or ring 9 is provided with straight teeth 13 adapted to mesh with a pair of pinions rotatably about axes fixed on the external crown or ring 7 and upon the foot 6, respectively. The two pinions 14 are driven and interconnected by drive chains 15 to a pinion 16 driven by a hydraulic motor 17 mounted upon another foot 18 rigid with the external crown or ring 7. Thus when the motor 17 is hydraulically fed, it displaces the inner crown within the external crown via pinion 16, chains 15 and the pinions 14.

In the lower horizontal branch of the U-section channel forming the ring or crown 7, there is provided a throughgoing slot 19 traversed by a pin 20 to which the head of a blade 21 is affixed. The blade 21 is inwardly and downwardly curved and, once drawn into the soil beneath the shrub, can be rotated to sever the root ball from the surrounding soil.

The lifting unit 5 comprises a pincers formed by a pair of jaws 23 pivotal about an axis 4 on an arm 25, the pivoting action being effected by any conventional mechanism, e.g. a hydraulic cylinder 23a which is articulated at 23b to one of the jaws and has its piston rod 23c formed with a pivot pin 23d connected to the other arm (see FIG. 13).

The axis 24 is vertical or substantially vertical and the arm 25 is articulated at 26 to the support 3 by a Cardan universal or ball joint enabling the arm 25 to move with at least two degrees of freedom.

This movement can be effected by a cylinder 25a connected below the arm 25 by a ball joint 25d to the arm 25, the cylinder arrangement 25a serving primarily to raise and lower the arm 25.

The lateral movement is contributed by a further cylinder 25g (FIG. 10) having a ball joint 25h articulated to the support 3 and a piston rod 25i terminating in a ball joint 25j.

Thus two cylinders are provided on the chassis 3 to impart to the arm 25 movement in the vertical plane on the one hand and lateral movement on the other hand.

Figure 2:
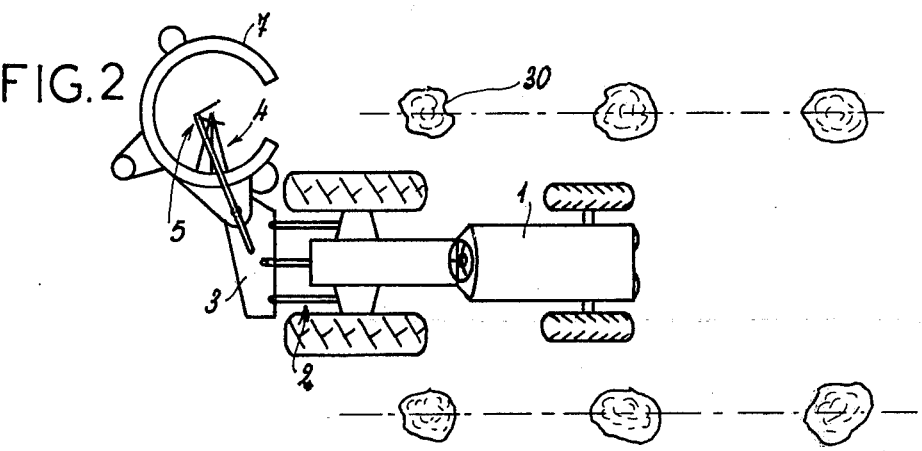
FIG. 2 is a similar view of the same machine showing the latter in preparation for the initial step in uprooting one of the shrubs.
Figure 3:
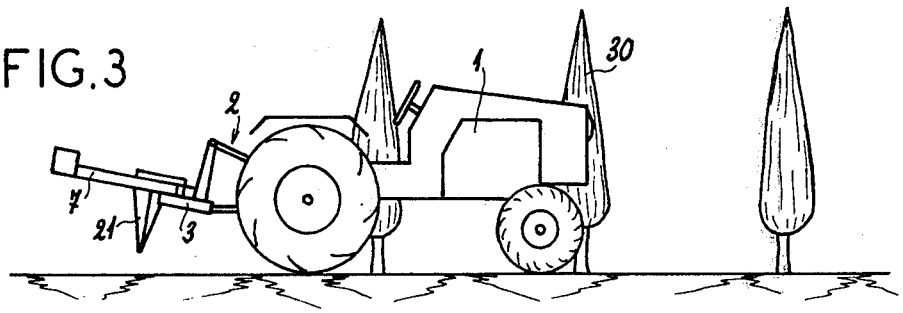
FIG. 3 is a side elevational view of this machine in the position corresponding to FIG. 2.
Figure 7:
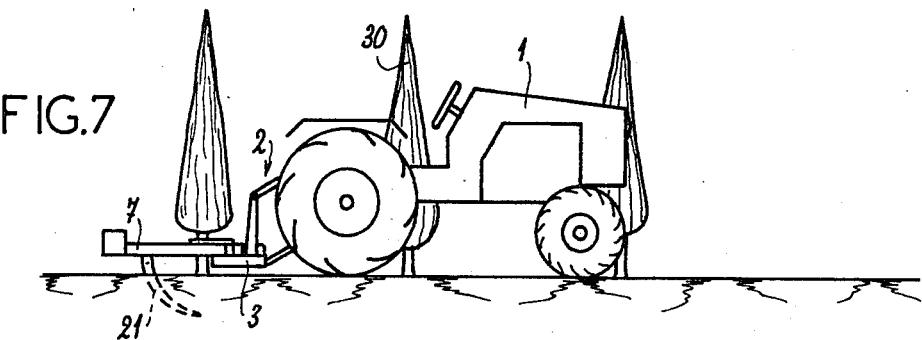
FIG. 7 is a side elevational view with the machine in the position corresponding to FIG. 6.

A further cylinder arrangement represented by the dot-dash line 27 is pivotally connected at 28 to the support 3 and at 29 to the foot 6 and serves to swing the foot 6 and the crowns thereof in a horizontal plane from the position shown in FIG. 1 into the position shown in FIG. 2.

When the machine is not in use or traveling to a site at which it may be used, e.g. on the road, or between two rows of shrubs as shown in FIG. 1, the assembly 4, 5 is thus positioned directly behind the tractor along its longitudinal axis so that the overall width of the system is limited. When, however, a selected shrub is to be removed (FIG. 2) the cylinder arrangement represented by the line 27 swings the crowns outwardly into an outrigger position.

In this position, the opening 8 of the fixed crown 7 and the opening of the movable crown 9 registering therewith are turned upwardly and these openings and the axes of the crowns are aligned with the axis of the shrub to be removed.

In order to uproot the first shrub of the row, the blade 21 is caused to penetrate the soil. This penetration is automatic under the effect of the weight of the machine, the lifting hydraulics being released, while the tractor is advanced from, for example, the position shown in FIGS. 2 and 3 to the position shown in FIGS. 4 and 5. In this position the pointed tip of blade 21 lies substantially below the axis of the shrub and the shrub is centered within the two crowns 7 and 9. In this position, the tractor movement is terminated and motor 17 is operated to rotate the crown 9 and the blade 21 (see FIGS. 6 and 7) to sweep the blade beneath the root accumulation and thereby sever a root ball 31 from the surrounding soil.

Figure 8:
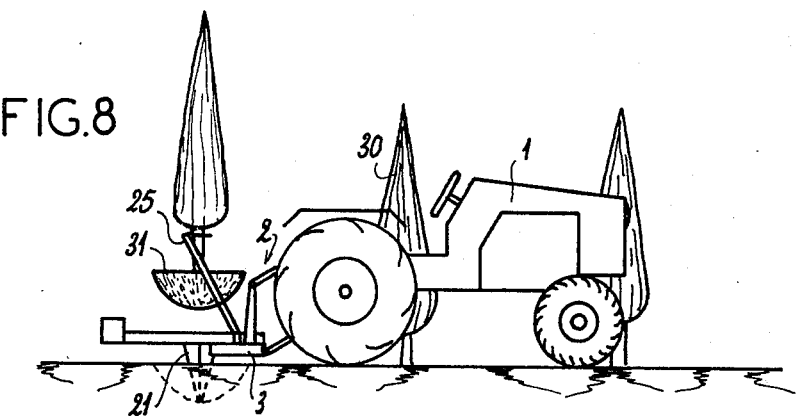
FIG. 8 is a side elevational view showing the next step in which the shrub has been lifted from the ground.
Figure 9:
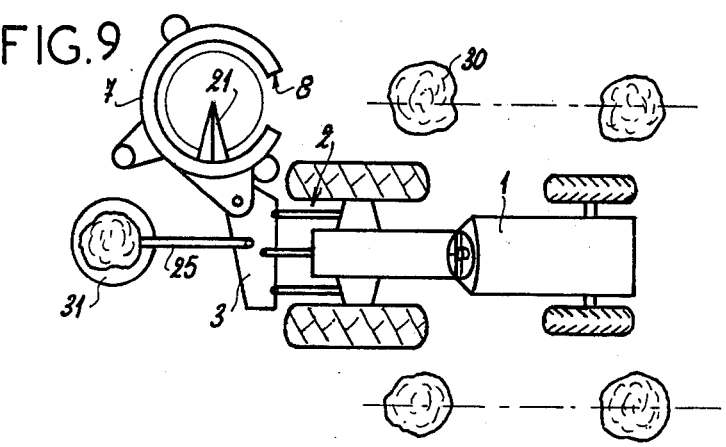
FIG. 9 is a plan view showing the machine in a position in which the shrub has been swung directly behind the tractor.

When the blade 21 terminates its rotation through 360° about the vertical axis of the crowns or rings 7 and 9, its movement is halted. The pincers 23 and arm 25 are brought into engagement with the root neck or trunk of the shrub, the jaws 23 are closed thereon and the arm 25 lifted as shown in FIG. 8 to draw the root ball out of the soil.

The arm 25, following uprooting of the shrub in the manner described, can then be swung laterally substantially into alignment with the tractor (FIG. 9) for depositing the shrub on the ground or planting it at a location to which the shrub can be carried by the tractor.

It will be apparent that the system described can admit of various modification within the scope of the principles of the invention. For example, the mechanism of the invention can be provided with its own drive system or prime mover rather than a tractor and the hydraulics can be driven by an engine other than the tractor engine.

The external crown or ring can have two openings located diametrically opposite one another to permit uprooting without requiring lifting of the apparatus after each cutting operation. This can be desirable when one requires separating the root ball from the surrounding soil at one time and lifting the shrub at a later time.

Obvious means can be provided for swinging the blade in or out to vary the size of the root ball.

I claim:

1. An apparatus for uprooting shrubs or the like with an intact root ball, comprising:

a support;

a tractor provided with hitch means for raising and lowering said support and for advancing said support horizontally;

a C-shaped ring mounted on said support and not rotatable about its axis;

a blade mounted on said C-shaped ring and adapted to be drawn beneath a shrub by the lowering and horizontal displacement of said support;

means for rotating said blade through 360° about a vertical axis of said C-shaped ring substantially coinciding with that of a shrub beneath which said blade has been drawn;

a pivot connecting said C-shaped ring with said support to enable said C-shaped ring to be swung between a position in line with said tractor and a position wherein said C-shaped ring lies laterally of the path of the tractor;

an arm engageable with said shrub and pivotally mounted on said support;

means for displacing said arm in a vertical plane and laterally to enable said arm to lift a shrub and its root ball from the ground after said root ball has been detached from the surrounding soil by said blade, said C-shaped ring having an opening, said means for rotating said blade including a movable ring slidably guided on said fixed ring and having an opening registering with the opening of said C-shaped ring whereby said rings can be drawn around said shrub upon horizontal movement of said support; and cylinder means for swinging said rings between said positions.

2. The apparatus defined in claim 1 wherein said movable ring is formed with teeth, said C-shaped ring carrying a pinion meshing with said teeth for driving said movable ring.

3. The apparatus defined in claim 2 wherein said pinion is driven by a hydraulic motor.

4. The apparatus defined in claim 1, claim 2 or claim 3 wherein said blade is downwardly and inwardly curved and said support is mounted on a three-point hitch of a tractor.

* * * * *